No. 688,436. Patented Dec. 10, 1901.
O. RICHTER.
FIRE ESCAPE.
(Application filed Aug. 2, 1901.)

(No Model.) 2 Sheets—Sheet 1.

Witnesses:
William Schulz
Edward Ray

Inventor
Oswald Richter
by Roeder & Brieur Att'ys

No. 688,436. Patented Dec. 10, 1901.
O. RICHTER.
FIRE ESCAPE.
(Application filed Aug. 2, 1901.)
(No Model.) 2 Sheets—Sheet 2.
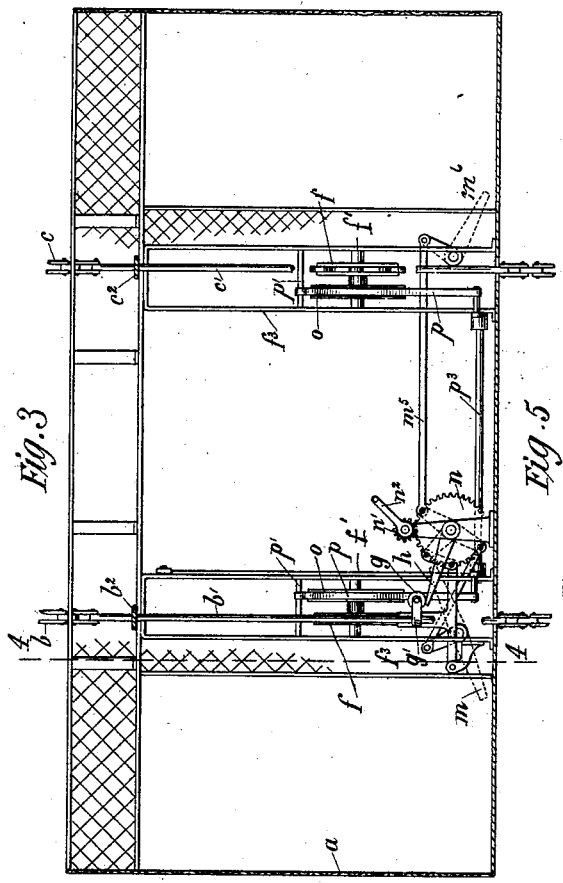
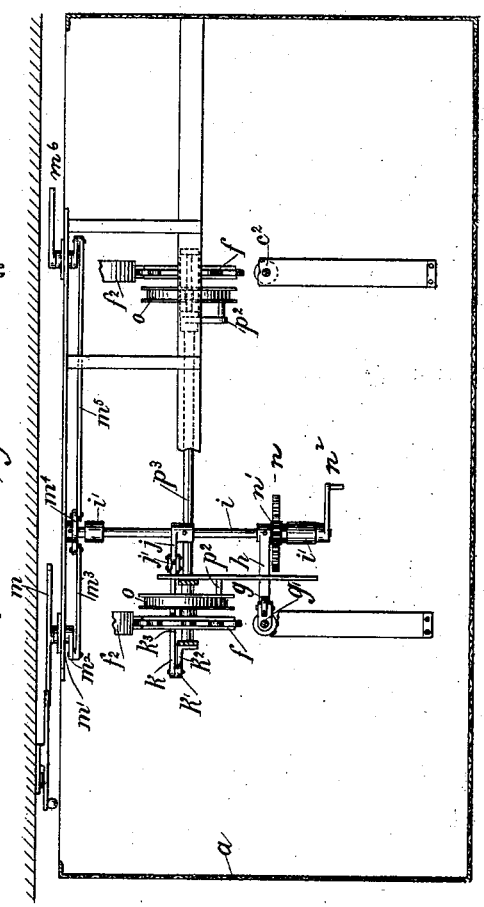
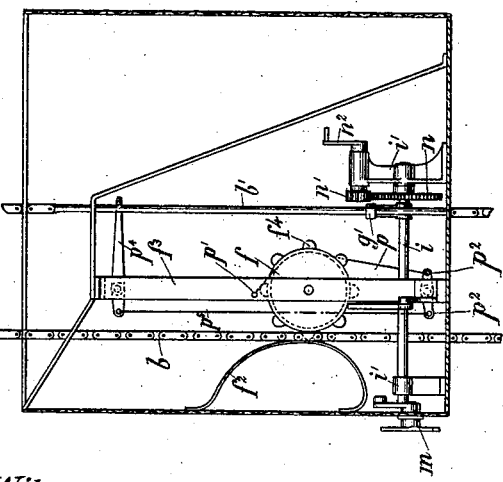
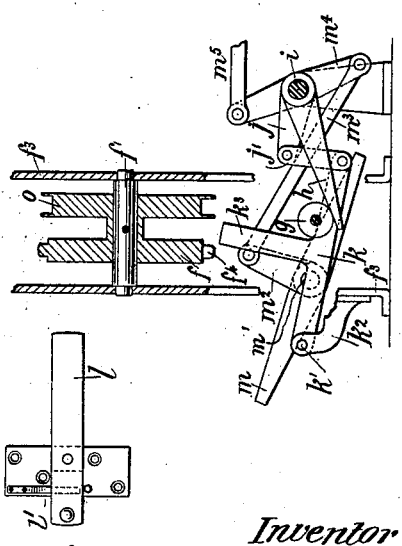
Witnesses
William Schulz
Edward Ray
Inventor
Oswald Richter
by Roeder & Briesen Attys

UNITED STATES PATENT OFFICE.

OSWALD RICHTER, OF RARITAN, NEW JERSEY.

FIRE-ESCAPE.

SPECIFICATION forming part of Letters Patent No. 688,436, dated December 10, 1901.

Application filed August 2, 1901. Serial No. 70,631. (No model.)

*To all whom it may concern:*

Be it known that I, OSWALD RICHTER, a citizen of the United States, and a resident of Raritan, Somerset county, New Jersey, have invented certain new and useful Improvements in Fire-Escapes, of which the following is a specification.

This invention relates to a fire-escape consisting of a cage which may be readily moved to any of the windows and will be automatically arrested as soon as it has arrived at the desired elevation. The start, stoppage, and speed of descent of the cage are under the full control of its occupants.

Figure 1:
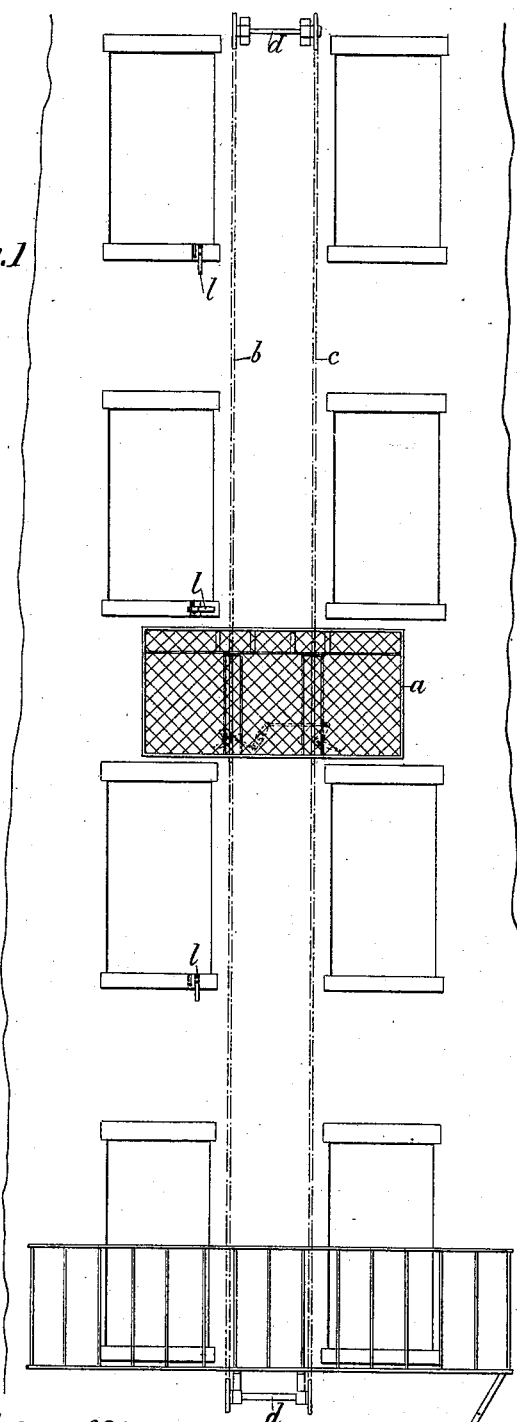
Figure 2:
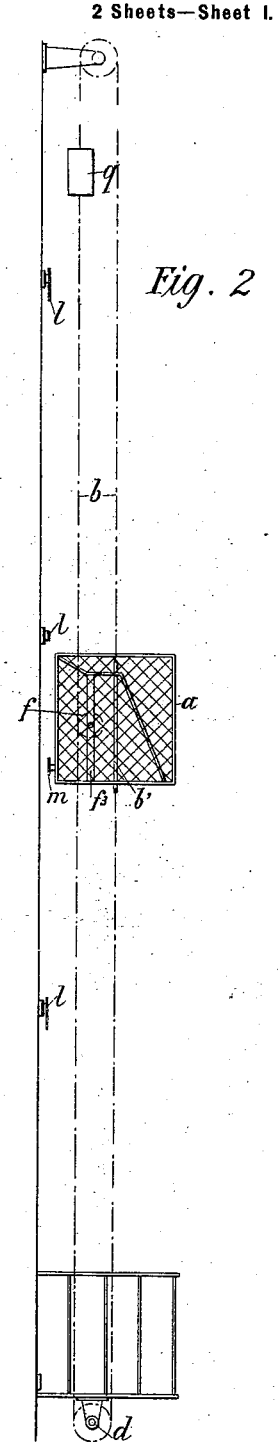

In the accompanying drawings, Figure 1 is a front elevation of my improved fire-escape, showing it applied to a building; Fig. 2, a side elevation thereof; Fig. 3, a vertical longitudinal section of the fire-escape cage; Fig. 4, a cross-section on line 4 4, Fig. 3; Fig. 5, a plan view with some of the parts broken away; Fig. 6, an enlarged detail of the sprocket-wheel and its locking mechanism, and Fig. 7 a detail of the stop $l$.

The letter $a$ represents a passenger cage or carriage adapted to travel up or down along the wall of a building. Through the cage pass two endless chains $b$ and $c$, running over pulleys $d$ $d$ at the top and bottom of the building. When the two runs of each chain are locked, the cage is arrested, while when the chains are unlocked they are free to be drawn over the pulleys $d$ by hand or otherwise, so as to raise or lower the cage. The construction of my improved fire-escape is such that the unlocking may be effected from the windows placed within reach of either of the chains, so that by pulling such chain the endangered person may draw the cage up. A stop-bar swung across the path of one of the cage-levers arrests the cage as soon as it has reached the landing desired. The descent of the cage is under the full control of its occupant.

Within each chain is incorporated inside the cage a rod $b'c'$, constituting a rigid chain-link and passing through guides $b^2 c^2$. These guides also serve to connect the chains to the cage. A frame $f^3$ within the cage serves as a bearing for the axles $f'$ of a pair of sprocket-wheels $f$, which are adapted to be engaged by that run of the chains $b$ $c$ that do not embody the rods $b'$ $c'$. To prevent accidental disengagement of the chain-links from the sprocket-wheels, yielding pressers $f^2$ are provided.

To the rod $b'$ of chain $b$ is riveted a lug $g'$, constituting the bearing for a friction roller or catch $g$, which is adapted to depress the tappet $h$ of a rock-shaft $i$, turning in bearings $i'$. The shaft $i$ has an arm $j$, connected by link $j'$ with a lever $k$, pivoted at $k'$ to a bracket $k^2$ of frame $f^3$. The lever $k$ is T-shaped, having an upwardly-projecting arm or detent $k^3$, which when in an upright position will project in the path of the teeth $f^4$ of sprocket-wheel $f$. When the rod $b'$ is in its raised position, the roller $g$ will clear the tappet $h$ and the detent $k^3$ will arrest wheel $f$. This will, in effect, lock the run of the chain, having rod $b'$ to the run engaged by wheel $f$, and consequently the chain and cage are locked against movement in either direction. When either of the chains $b$ or $c$ is pulled down from any of the windows and the rod $b'$ is consequently lowered, the roller $g$ will depress tappet $h$ and will rock shaft $i$ to tilt lever $k$ and withdraw the detent $k^3$ from wheel $f$, Fig. 6. The two runs of the chain are now unlocked, and by imparting motion to them the cage may be raised or lowered. A pull on the chain $c$ will have the same effect as a pull on chain $b$, because it will transmit motion to chain $b$ by pulleys $d$.

At each landing there is pivoted to the building a stop-arm $l$, Fig. 7, which may be swung into a horizontal or vertical position and is locked by a suitable catch $l'$. To arrest an upwardly-traveling cage opposite the window where the stop is to be made, the occupant of such window swings the arm $l$ across the path of a lever $m$ or a lever $m^6$. Lever $m$, pivoted to cage $a$ at $m'$, is connected to a rock-shaft $i$ by lever $m^2$, link $m^3$, and one arm of a double lever $m^4$. The other arm of the lever $m^4$ is connected by link $m^5$ to the lever $m^6$. Consequently when the free end of either of the levers $m$ or $m^6$ strikes the lower side of stop $l$ the shaft $i$ will be rocked to throw detent $k^3$ up and lock wheel $f$. After the cage has been brought to the landing desired and has received its charge the chain must again be unlocked to permit the descent of the cage. This is effected by a crank-handle $n^2$, which, by means of pinion $n'$, is intergeared with wheel $n$, fast on rock-shaft $i$. The handle $n^2$ is turned until the detent $k^3$ has again cleared wheel $f$. By a reverse movement of the handle $n^2$ the cage is stopped at any point desired. The stops $l$ should of course be swung up at all landings which are to be cleared by the cage. The speed of the descent is controlled by a pair of brake-disks O, engaged by brake-straps $p$. These straps are secured at one end $p'$ to frame $f^3$ and at the other end to arms $p^2$ of a rock-shaft $p^3$, which is operated by hand-lever $p^4$ through connection $p^5$. By depressing this hand-lever both brakes are simultaneously applied. A counterweight $q$ is used to raise the cage, while its descent is effected by the weight of the passengers.

It will be seen that by my invention the cage is readily brought opposite the desired window and is then automatically arrested, while the start and the speed of the descent are under the perfect control of the operator.

What I claim is—

1. A fire-escape comprising a cage, an endless chain, a sprocket-wheel within the cage engaging one of the chain-runs, a detent adapted to interlock with said sprocket-wheel, and mechanism for operatively connecting said detent with the other chain-run, substantially as specified.

2. A fire-escape comprising a cage, an endless chain, a sprocket-wheel within the cage engaging one of the chain-runs, a friction-roller on the other chain-run, a rock-shaft engaged by the friction-roller, and a lever operatively connected to the rock-shaft, said lever being provided with a detent adapted to interlock with the sprocket-wheel, substantially as specified.

3. A fire-escape comprising a cage, an endless chain, a sprocket-wheel within the cage engaging one of the chain-runs, a detent adapted to interlock with said sprocket-wheel, a rock-shaft for operating said detent, means for operatively connecting said rock-shaft with the other chain-run, and a crank-handle for operating said rock-shaft by hand, substantially as specified.

4. A fire-escape comprising a cage, an endless chain, a sprocket-wheel within the cage engaging one of the chain-runs, a detent adapted to interlock with said sprocket-wheel, mechanism for operatively connecting said detent with the other chain-run, a brake-disk, a brake-strap engaging the same, a rock-shaft connected to the brake-strap, and a hand-lever for operating the rock-shaft, substantially as specified.

Signed by me at Raritan, Somerset county, New Jersey, this 20th day of July, 1901.

OSWALD RICHTER.

Witnesses:
GEORGE WACHTER,
CHARLES PHILLIPS.